Dec. 9, 1969   B. S. BAKER   3,482,320
APPARATUS FOR THE MEASUREMENT OF LENGTH
Filed July 21, 1967
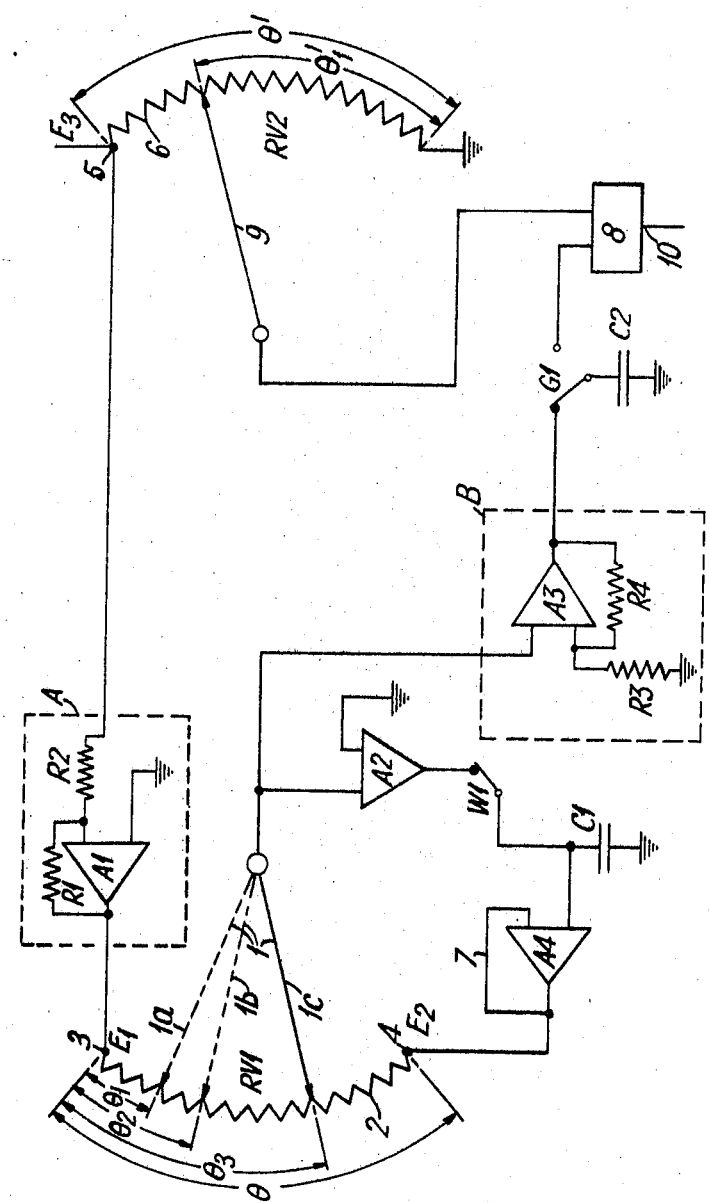
BERNARD STUART BAKER
Inventor
By DAVIS, HOXIE,
FAITHFULL & HAPGOOD, His Attorneys 3,482,320
APPARATUS FOR THE MEASUREMENT OF LENGTH
Bernard Stuart Baker, Coventry, England, assignor to Courtaulds Limited, London, England, a British company
Filed July 21, 1967, Ser. No. 655,011
Claims priority, application Great Britain, Aug. 5, 1966, 35,110/66
Int. Cl. G01b *5/00;* G01n *3/00*
U.S. Cl. 33—143                                6 Claims

ABSTRACT OF THE DISCLOSURE

An apparatus for determining the relationship between a change in length and the original length of an article, particularly a textile filament in tensile testing equipment, which apparatus comprises means for generating a voltage which changes linearly with changes in the length of the article, means for adjusting to any prechosen value the change of voltage which is generated by the voltage generating means when the length of the article is increased by an amount equal to its original length, and an electrical comparator circuit for comparing the generated voltage with the prechosen value to give a determination of the extension (e.g. the percentage extension).

---

This invention is concerned with apparatus for the measurement of length and in particular for the comparison of measurements of the length of an article before and after its extension or contraction on subjection to a force tending to alter its length. The invention is particularly applicable to the measurement of the lengths, during the determination of their tensile properties, of textile or other elongated elements such as yarns, threads, filaments, wires, and the like, hereinafter referred to as "filaments."

The determination of the tensile properties of a filament, particularly the load necessary to break the filament and the extension of the filament at break, is accomplished by clamping the filament between two clamps one of which is movable, under the influence of a driving motor to tension and elongate the filament, whilst the other is connected to a load cell to measure the load on the filament during elongation and the force necessary to break the filament. To measure the length of the filament the movable clamp may be connected to the wiper on a potentiometer so that a voltage is produced which is proportional to the length of the filament.

Hitherto, the determination of the fractional relationship between the change in length and the original length of an article, for example a filament, has only been possible by separate determination of the original and the final lengths and by subsequent computation, generally by the operator of the apparatus. The present invention provides an apparatus by the use of which the relationship between the lengths, generally desired as a percentage, may be given directly.

According to this invention, an apparatus for determining the relationship between a change in length and the original length of an article comprises means for generating a voltage which changes linearly with changes in the length of the article, means for adjusting to a prechosen value the change of voltage generated by the voltage generating means for a change of length proportional to the original length, and means for comparing the generated voltage with the prechosen value to give a determination of the relationship between the change in length of the article and its original length.

The voltage generating means is preferably a potentiometer, the wiper of which is connected to the article so as to move along the potentiometer coil as the length of the article is changed. The adjustment of the voltage change on movement of the wiper may then be effected by variation of the voltage drop applied across the potentiometer coil. In the preferred arrangement the potential at the wiper, when it is at its position corresponding to the article having its original length, is corrected to zero volts or a convenient voltage reference level, by adjustment of the potential at least one of the terminals of the potentiometer coil. This means that the total voltage drop across the potentiometer coil is varied according to the original length of the article and hence that the difference between the voltages on the wiper at the positions corresponding to the original length of the article and to the length of the article when changed by an amount equal to the original length, can be any prechosen value.

The comparison between the prechosen value and the actual voltage generated by the voltage generating means may be effected, to give a direct reading of the relationship between the change in length of the article and its original length, by having a motor drive the wiper of a further potentiometer along its coil until the potential at that wiper equals the voltage generated, as indicated by a comparator. At the point of equality the motor is stopped and the position of the wiper in relation to a calibrated scale is read. The scale may be calibrated to give a percentage or other relationship.

The tensile properties of a filament are commonly expressed as the loads required to extend the filament by given amounts, for example by 100%, and the load necessary to break the filament, together with the extension of the filament at breakage. In the specification of our copending patent application No. 655,012 of even date, we have described an apparatus for automatically comparing the loads imparted to each filament during testing so that the load at a given extension or at breakage may be given directly rather than have the operator perform the necessary subtraction of the load at the start of the test. An apparatus embodying the present invention may be usefully employed in conjunction with that described in the specification of our above numbered application to provide simultaneous automatic computation of the load and of the percentage extension of each filament under test.

An embodiment of the present invention is illustrated by way of example, by the accompanying drawing which is a block circuit diagram of parts of an apparatus for determining the physical properties of filaments.

In the drawing a high grade linear potentiometer RV1 comprises a wiper 1, shown in three positions 1a, 1b and 1c for the purpose described below, and an arcuate coil 2 having terminals 3 and 4 to which potentials $E_1$ and $E_2$ are applied. The angular deflections of the wiper 1 with respect to the coil 2 at positions 1a, 1b and 1c respectively are $\theta_1$, $\theta_2$ and $\theta_3$, whilst the total possible angular deflection of the wiper 1 between the terminals 3 and 4 is $\theta$.

The terminal 3 of the coil 2 is connected to the output terminal of a unity-gain operational amplifier A1, which has unity gain but which reverses the polarity of the output relative to its input. The output terminal of the buffer amplifier 1 is also connected to a first input terminal of the amplifier through a resistor R1. The first input terminal is also connected through a resistor R2 to a terminal 5 of the coil 6 of a second potentiometer RV2. A stabilised negative potential $E_3$ is applied to the terminal 5. The second input terminal of the amplifier A1 is earthed. The sub-circuit containing the amplifier A1, and the resistors R1 and R2 performs a function distinct from the circuit as a whole and is shown bounded by a dotted line A, the sub-circuit being termed hereinafter sub-circuit A.

The wiper 1 is connected electrically to a first input terminal of a high-gain, operational amplifier A2 and also to a first input terminal of a second high-gain operational amplifier A3. The second input terminal of the amplifier A2 is earthed and the output terminal is connected to the fixed contact of a switch W1. The moving contact of the switch W1 is connected to one side of a low leakage, high grade capacitor C1, the other side of which is earthed. The moving contact of the switch W1 is also connected to a first input terminal of a third high-gain, operational amplifier A4, the output terminal of which is connected to the terminal 4 of the coil 2 and to the second input terminal through a feed-back connection 7.

The second input terminal of the amplifier A3 is connected through a resistor R3 to earth and also through a resistor R4 to the output terminal of the amplifier A3, which output terminal is also connected to a first fixed contact of a two-way switch G1. The moving contact of the switch G1 is connected to one side of a second capacitor C2, the other side of which is earthed. The second fixed contact of the switch G1 is connected to a first input terminal of a comparator unit 8, the second input terminal of which is connected to a wiper 9 which contacts the coil 6 of the potentiometer RV2. The comparator unit 8 should have as high an input impedance as possible (suitably an input resistance in excess of $10^{10}$ ohms), and the switches W1 and G1 should have negligible leakage current under the potentials to which they are subjected during operation of the apparatus. For highest accuracy, hermetically sealed relays may be used for the switches W1 and G1. The angular deflection of the wiper 9 in relation to the coil from one terminal which is earthed towards terminal 5 is $\theta_1'$ whilst the total possible angular deflection of the wiper in relation to the coil 6 is $\theta$. The wiper 9 is connected mechanically to a rotatable drum (not shown) by the position of which, in relation to a stationary scale (or pointer), the results of tests are shown. During each test, as described hereinafter, the drum is caused to rotate by an electric motor (also not shown) from its base position to the position where it indicates the test result. The drum is stopped at the correct position by interrupting the electric current to the motor driving the drum by means (also not shown) connected to the output terminal 10 of the comparator unit 8. The comparator unit operates to stop the drum when the potentials applied to its input terminals, i.e. the potentials on the wiper 9 and on the capacitor C2, are equal.

The amplifier A3 and the resistors R3 and R4 are shown within a dotted line B and form sub-circuit B, which has a function distinct from that of the circuit as a whole as explained below.

Use of the apparatus for the determination of the extension of a filament at break is accomplished by connecting the wiper 1 to the movable clamp of a tensile testing apparatus. The filament to be tested is clamped between that clamp and a second fixed clamp which is connected to a load cell (not shown) for the measurement of the load on the filament. The filament is clamped slackly between the clamps and is then pretensioned to pull out all the crimps in the filament. The length of the filament under pretension is the "original" length of the filament from which the extension of the filament during testing is based.

The operation of pretensioning a filament by the application thereto of a prechosen load is described in detail in the specification of our copending patent application No. 655,018 of even date.

During pretensioning, the filament is elongated by movement of the movable clamp connected to the wiper 1 which moves from the position 1a to the position 1b. Also during pretensioning the potential $E_2$ is varied so as to maintain the wiper 1 at earth potential, irrespective of the position of the wiper in relation to the coil 2. When the point of pretension is reached the potential $E_2$ is stabilised at the potential it has then reached.

The part of the circuit used for variation of the potential $E_2$ comprises the potentiometer RV1 the amplifiers A2 and A4 and the capacitor C1. The circuit operates in such a way as to tend to reduce to zero any potential difference between the two input terminals of the amplifier A2. The potential on the capacitor C1, which functions as a potential stabilisation store, is applied to the amplifier A4 so that this potential appears at the output terminal of the amplifier, which is already specified as the potential $E_2$. If the wiper 1 is considered to be at a potential slightly removed from earth potential, the capacitor C1 will become charged through the amplifier A2 and the potential $E_2$ will thus be altered through the amplifier A4 in a direction to tend to decrease the potential difference between the wiper 1 and earth. Hence, a compensating loop is formed which progressively changes the potential $E_2$ until it is of sufficient magnitude and sign to produce earth potential on the wiper.

Consider now an example of the operation of the circuit for maintaining wiper 1 at earth potential. If $E_1$ is, say, $+20$ volts and $\theta_1 = \theta/4$, for wiper 1 to be at earth potential $E_2$ must equal $-60$ volts. If then, on pretensioning, wiper 1 moves to the position 1b where $\theta_2 = \theta/2$, the potential on wiper 1 would change, if $E_2$ remained at $-60$ volts, to $-20$ volts. The circuit, however, continuously monitors the potential on the wiper 1 and adjusts the potential $E_2$ to $-20$ volts so that the wiper 1 is returned to earth potential.

At the point of pretension, the switch W1, which hitherto has remained closed, is caused to open (by means not shown herein, but described in our copending patent application No. 655,018 of even date). The wiper 1 is then at earth potential whilst the potential $E_2$ is stabilised by the capacitor C1 at the potential it has reached during pretensioning. With the switch G1 in the position shown in the drawing, the circuit is then ready to measure the potential of the voltage on the wiper 1 during stretching the filament.

As explained above, sub-circuit B may be disregarded insofar as the principle of operation of the circuit is concerned. Thus, with the potential $E_2$ stabilised as described above, and with the sub-circuit B disregarded, when the wiper 1 moves, during stretching the filament, towards the position 1c which is the position of the wiper on filament breakage, the capacitor C2 is charged to the same potential as that on the wiper 1. At the point of breakage of the filament, when the wiper 1 reaches the position 1c the switch G1 is changed automatically so that the charge on the capacitor C2 is applied to the input terminal of the comparator unit 8. Simultaneously, the potential on the wiper 9 is applied to the other input terminal of the comparator unit. As the switch G1 is changed from the position shown in the drawing, a further switch (not shown) closes the circuit supplying the motor driving the drum connected to the wiper 9. Hence, the potential on the wiper 9 increases from earth potential as the drum rotates. The comparator unit 8 is connected so as to stop rotation of the drum when the potential on the wiper 9 becomes equal to that on the capacitor C2, which is equal to the potential on the wiper 1 at position 1c as described above. The result is given by the position of the drum when stopped.

The circuit described is thus able by suitable calibrations on the drum, to show the percentage extension of the filament at break, or in fact at any other desired point during testing, irrespective of the position of the wiper 1 in relation to the coil 2 at the point of pretension, which defines the original length of the filament.

Consider further the example described above; an extension of the filament by, say, 100 percent causes the wiper 1 to move from a position 1b where $\theta_2 = \theta/2$, to a new position 1c such that $\theta_3 = \theta$.

With, at pretension, $E_1=+20$ volts and $E_2=-20$ volts, the voltage on the wiper 1 which is equivalent to a 100 percent extension equals $-20$ volts. The potentials applied to the coil 6 of the potentiometer RV2 are then arranged so that the drum connected to the wiper 9 indicates a 100 percent extension when the potential on the wiper is $-20$ volts.

Consider now a further example in which, at pretension, $\theta_2=3\theta/8$. For the wiper 1 in position 1b to be at earth potential, $E_2$ equals $-33\frac{1}{3}$ volts. An extension of the filament by 100 percent would then be accomplished when $\theta_3=3\theta/4$, in which case 100 percent extension would still correspond to a potential of $-20$ volts on the wiper 1.

In order to allow for testing filaments having a variety of physical properties on a single machine it is necessary to be able to adjust the potentials employed in the circuit so that a complete rotation of the drum may be equivalent to an extension of from, say, 20 percent to, say, 500 percent or even higher. This is the combined function of sub-circuits A and B. Individually, sub-circuit A operates as a buffer for the stabilisation of the potential $E_1$ despite variations in the current required and also as a ready means for altering the ratio between the potentials $E_1$ and $E_3$ (by varying resistors R1 and R2). Sub-circuit B functions individually as a means of altering the output sensitivity of the circuit by increasing or decreasing the potential to which the capacitor C2 is charged in relation to the potential on the wiper 1, the former being related to the latter by the ratio of the resistances of the resistors R3 and R4.

The relationship between the resistances of the resistors R1, R2, R3 and R4 may be derived from the equations relating the input and output potentials of each of the sub-circuits and equations relating the angles $\theta_2$ and $\theta_3$ with $\theta$ and the angle $\theta_1'$ with $\theta'$ in terms of the potentials $E_1$, $E_2$ and $E_3$. Where $\theta_3=2\theta_2$ (i.e. $\theta_1'$ corresponds to a 100 percent extension):

$$\frac{\theta_1'}{\theta'}=\frac{R1(R3+R4)}{R2R3}$$

Thus, the circuit may readily be used in apparatus for determining the physical properties of filaments having a wide range of extensions without undue loss in sensitivity.

I claim:
1. Apparatus for determining the relationship between a change in length and the original length of an article, comprising means for generating a voltage which changes linearly with changes in the length of the article, means for adjusting to a prechosen value the change in the voltage generated by the voltage generating means for a change in length constituting a prechosen fraction of the original length, and means for determining the change of voltage generated by the voltage generating means for an unknown fractional change in length in order to determine this fractional change.

2. Apparatus as claimed in claim 1, in which the voltage generating means is a potentiometer the wiper of which is connected to the article so as to move along the potentiometer coil as the length of the article is changed.

3. Apparatus as claimed in claim 2, in which means is provided for setting the potential of the wiper at zero when its position corresponds to the original length of the article.

4. Apparatus as claimed in claim 1, in which the means for comparing the actual voltage generated by the voltage generating means and the prechosen voltage comprises a comparator circuit fed with the generated voltage at one input and the output from the wiper of a second potentiometer at the other input.

5. Apparatus as claimed in claim 4, in which the wiper of the second potentiometer is coupled to a graduated scale calibrated directly in percentage extension.

6. Apparatus as claimed in claim 3 in which the means for setting the wiper potential at zero when its position corresponds to the original length of the article includes a capacitor.

References Cited

UNITED STATES PATENTS 3,295,365   1/1967   Larrigan et al.
3,391,572   9/1968   Burr _____ 73—88.5

HARRY N. HAROIAN, Primary Examiner

U.S. Cl. X.R.

73—88